June 18, 1929.  J. ELLERBROEK  1,717,376

BAIT HOLDING FISHHOOK STRUCTURE

Filed March 9, 1928

INVENTOR.
John Ellerbroek
BY
His ATTORNEYS.

Patented June 18, 1929.

1,717,376

UNITED STATES PATENT OFFICE.

JOHN ELLERBROEK, OF SPENCER, IOWA.

BAIT-HOLDING FISHHOOK STRUCTURE.

Application filed March 9, 1928. Serial No. 260,488.

This invention relates to a bait-holding fish-hook structure, and more particularly to what may be called a shank device, to which fish hooks may be connected.

The object of the invention is the construction of a shank device, which is provided with an efficient loop-penetrating end, and with a body of strong material that will not be affected by any acid of a live fish and which will support fish of varying weights.

Another object of the invention is the construction of a simple and efficient shank device formed preferably of "piano" wire (excellent steel wire silver plated) and soldered where the wire is bent in contacting condition, providing a relatively broad shank, in cross section, whereby a very durable device is produced.

With the foregoing and other objects in view, my invention comprises certain novel constructions, combinations and arrangements of parts as will be hereinafter fully described, illustrated in the accompanying drawings, and more particularly pointed out in the appended claim.

Figure 1:
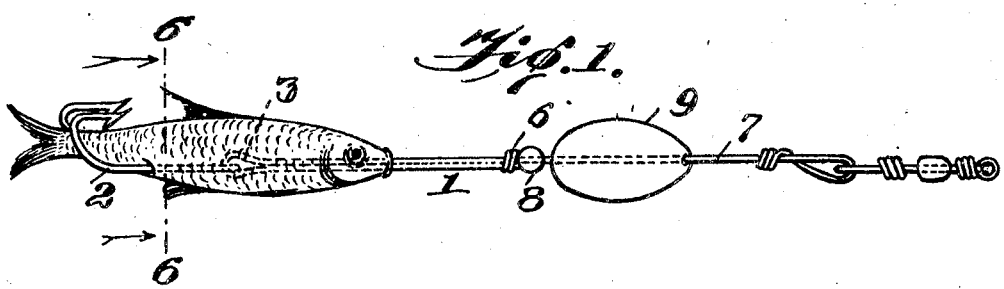
Figure 1 is a view in side elevation of a device constructed in accordance with the present invention, partly shown in dotted lines, and with a minnow in position thereon.

Referring to the drawings by numerals, 1 designates the shank device, which is formed from "piano" wire (excellent steel wire silver plated). I use piano wire because of its great strength. In my device, the double hook 2 is removable from the shank device; it is possible to use hooks of any size with the same shank device; my shank device may be used for catching fish weighing as much as from 500 to 1,000 pounds, and the piano wire will not break where other wires would. Further, another important advantage resulting from the use of piano wire, is that the hydro-chloric acid in live minnows will eat other wire shafts or shanks, in as short time as one day, but I have discovered that the acid of live minnows will not affect piano wire.

Figure 2:
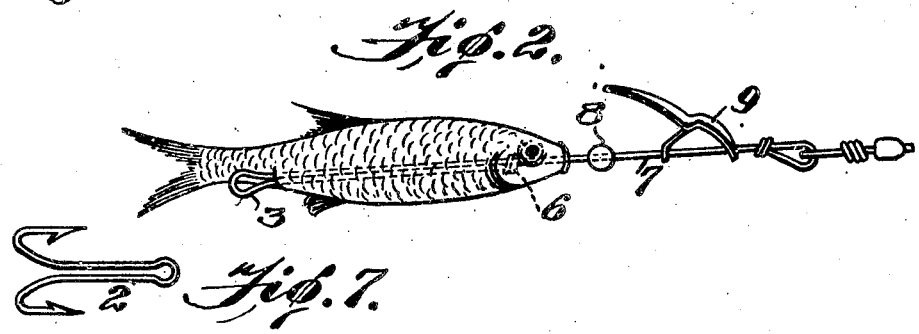
Figure 2 is a view in side elevation, showing my device as it appears when placing the minnow thereon.
Figure 7:
Figure 7 is a view of the hook shown in Figure 1.
Figures 3, 4:
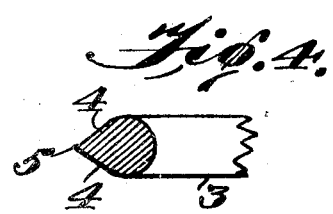
Figure 3 is an enlarged fragmentary plan view of the device, showing the loop-penetrating end.
Figure 4 is a sectional view taken on line 4—4, Figure 3, and looking in the direction of the arrows.
Figures 5, 6:
Figure 5 is a sectional view taken on line 5—5, Figure 3, and looking in the direction of the arrows.
Figure 6 is a section taken on line 6—6, Figure 1, and looking in the direction of the arrows.

The shank device is formed by doubling two parts, against each other, (Figures 1 and 3) and soldering these parts, producing in cross section (Figure 3) a relatively broad shank, which is very strong and durable. On the outer end of the relatively broad shank, I form a loop 3, which is in the nature of an eye; this loop is usually forced through nearly the entire length of a minnow (Fig. 2), and the outer edge of the loop may be bevelled or slightly flattened at 4, 4, producing a V-shaped knife or cutting edge 5 in cross section (Figs. 4 and 5), which greatly facilitates the passing of the loop 3 through the fish. The inner end of one of the units of the shank is preferably coiled, at 6, around the other unit 7, acting as a stop for the sliding ball 8, against which the spinner 9 may bear. The sharp penetrating loop is forced through the fish (Fig. 2)—unless for some reason the operator prefers just to run the shank device through the mouth and out one of the gills of the fish—to expose the loop near the tail, then the double hook 2 is placed on the loop, whereupon the operator draws the shank device forward, causing the hook to partly enter the fish or minnow, with the minnow straddling the hook, giving it a natural appearance, which attracts the fish to be caught.

It is to be understood that with devices embodying a single hook permanently fastened to a shaft or shank, it is necessary that the minnows or frogs used as bait be hooked on in such a way that they will not ride naturally in the water; that is to say, the hook is placed through and comes out the back or about middle part of the body, preventing the bait from riding through the water in a natural position. In my device, the double hook 2 may be sprung between the fingers sufficiently to easily detach the same from the loop 3. When the hook is off the loop, the minnow, frog or other bait is then placed on the straight shank, by inserting the sharp loop in the mouth of the minnow or frog and extending it straight through the body of the bait. Several advantages are obtained by so doing, first, it is practically impossible for the minnow or frog to be lost, as it is held firmly in place by the double hook. Secondly, the minnow or frog will ride naturally through the water, by reason of the fact that the body is attached and held in place by the extension of the metal shank straight through the body, instead of being held at an angle, as is necessitated by the use of the single hook. With my device, from three to five fish can ordinarily be caught with one bait, because it is practically impossible for the fish to get the bait off the hook or destroy the bait without being caught with the double hook. Not only do the minnows ride through the water in a natural position, after being placed upon my device, but the same is true of frogs, when they are used as bait; the frog laying naturally with one leg over each hook, of the double hook. The bait may be dead or alive, because with my novel device, the bait is held in such a way that it must ride naturally through the water.

Therefore, it will be seen that I have produced a shank device which, in the preferred embodiment illustrated in the drawings, comprises a relatively broad body formed by soldering two parts or units of piano wire together, and forming, at the outer end, a sharpened blade-like or penetrating loop, to which different types of detachable hooks are preferably attached.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claim.

What I claim is:

As a new article of manufacture, a shank device formed from a single piece of wire folded together and soldered at the center of the device and spaced apart at its outer end, said spaced apart portion forming an elongated penetrating loop, the body of said loop provided with a V-shaped outer cutting edge in cross section, and said shank device provided with means for connecting the tackle and mounting a spinner thereon, substantially as shown and described.

In testimony whereof I hereunto affix my signature.

JOHN ELLERBROEK.